(12) United States Patent
Piriyath et al.

(10) Patent No.: US 10,567,284 B1
(45) Date of Patent: Feb. 18, 2020

(54) TRANSPORT BATCHING TECHNIQUE FOR NETWORK COMMUNICATIONS

(71) Applicant: Juniper Networks, Inc., Sunnyvale, CA (US)

(72) Inventors: Shibu Piriyath, Bangalore (IN); Sridhar O S, Bangalore (IN); Umesh Mangla, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 33 days.

(21) Appl. No.: 15/816,420

(22) Filed: Nov. 17, 2017

(51) Int. Cl.
*H04L 12/741* (2013.01)
*H04L 12/803* (2013.01)
*H04L 12/801* (2013.01)
*H04L 12/833* (2013.01)
*H04L 29/06* (2006.01)
*H04L 12/18* (2006.01)

(52) U.S. Cl.
CPC ........ *H04L 45/745* (2013.01); *H04L 12/1886* (2013.01); *H04L 47/125* (2013.01); *H04L 47/193* (2013.01); *H04L 63/0245* (2013.01); *H04L 63/1408* (2013.01); *H04L 63/164* (2013.01); *H04L 47/31* (2013.01); *H04L 2212/00* (2013.01)

(58) Field of Classification Search
None
See application file for complete search history.

(56) References Cited

U.S. PATENT DOCUMENTS

| 7,082,477 B1 * | 7/2006 | Sadhasivam | H04L 63/0428 370/392 |
| 8,244,810 B1 | 8/2012 | Haldar | |
| 2002/0101872 A1 | 8/2002 | Boivie | |
| 2015/0188887 A1 * | 7/2015 | Thomas | H04L 12/4641 713/153 |

FOREIGN PATENT DOCUMENTS

WO    WO 2015/176277    11/2015

* cited by examiner

*Primary Examiner* — Peter Chen
*Assistant Examiner* — Jeff Banthrongsack
(74) *Attorney, Agent, or Firm* — Harrity & Harrity, LLP (57) ABSTRACT

A device may include one or more processors to receive, from at least one user device, multiple network packets. The device may identify, from the network packets, a set of individual network packets, the set including at least two of the received network packets that are destined for a particular destination device. The device may generate, based on the set of individual network packets, a batch packet, the batch packet including: the set of individual network packets, data identifying the number of individual network packets included in the set, and offset data for each of the individual network packets included in the batch packet. Based on the batch packet, the device may perform an action.

20 Claims, 7 Drawing Sheets

TRANSPORT BATCHING TECHNIQUE FOR NETWORK COMMUNICATIONS

BACKGROUND

Network devices, such as routers, switches, or the like, may handle data in the form of network packets (e.g., data packets). In some cases, network devices may transmit the network packets using a network. In some cases, network devices may perform other actions on network packets, such as encryption, decryption, load balancing, security scanning, or the like.

SUMMARY

According to some implementations, a device may include one or more processors to: receive, from at least one user device, multiple network packets; identify, from the multiple network packets, a set of individual network packets, the set of individual network packets including at least two of the multiple network packets, the at least two of the multiple network packets being destined for a particular destination device; generate, based on the set of individual network packets, a batch packet, the batch packet including: the set of individual network packets, data identifying a number of individual network packets included in the set of individual network packets, and offset data for each of the individual network packets included in the batch packet; and perform an action based on the batch packet.

According to some implementations, a non-transitory computer-readable medium may store instructions, the instructions comprising: one or more instructions that, when executed by one or more processors, cause the one or more processors to: receive, from a network device, a batch packet, the batch packet including: a set of individual network packets, data identifying a number of individual network packets included in the set of individual network packets, and offset data for each of the individual network packets included in the batch packet; perform an action based on the batch packet; obtain, from the batch packet, the set of individual network packets, each individual network packet, of the set of individual network packets, having been obtained from the batch packet based on the offset data for the individual network packet included in the batch packet; and cause the set of individual network packets to be transmitted toward at least one user device.

According to some implementations, a method may include: receiving, by a first network device and from at least one user device, multiple network packets; identifying, by the first network device and from the multiple network packets, a set of individual network packets, the set of individual network packets including at least two of the multiple network packets, the at least two of the multiple network packets being destined for a destination device; generating, by the first network device and based on the set of individual network packets, a batch packet, the batch packet including: the set of individual network packets, and offset data identifying a location of each individual network packet included in the set of individual network packets included in the batch packet; and performing, by the first network device, an action based on the batch packet.

DETAILED DESCRIPTION

The following detailed description of example implementations refers to the accompanying drawings. The same reference numbers in different drawings may identify the same or similar elements.

Network packets are often processed by network devices for a variety of reasons, e.g., to perform routing, encryption, decryption, load balancing, security processing, or the like. By way of example, a network device may encrypt or otherwise secure network packets for transmission, e.g., in a manner designed to prevent the network packets from being intercepted by a malicious actor and/or to make the network packets unintelligible to those who do intercept the network packets. In some situations, network devices are frequently processing network packets, e.g., frequently encrypting and decrypting network packets, and the operations performed on the network packets may consume relatively significant processing resources. In addition, the processing resources used to perform some processes on a small network packet are often the same or similar to the processing resources used to perform the process on a large network packet. Given a situation where a significant amount of the network packets processed by a network device are relatively small (e.g., relative to the maximum transmission unit (MTU)), a significant amount of processing resources may be consumed performing the process(es) on the small network packets.

Some implementations, described herein, provide a network device that is capable of receiving multiple network packets, identifying (from the multiple network packets) a set of individual network packets that can be combined into a batch packet, generating a batch packet that includes the identified set of individual network packets, and performing an action based on the batch packet (such as encrypting the batch packet). In some implementations, a network device that receives the batch packet can perform an action (such as decrypting the batch packet) and reconstruct the original set of individual network packets from the batch packet before causing transmission of the individual network packets to their intended destinations.

In this way, the ability for a network device to generate batch packets and reconstruct individual network packets from batch packets may reduce processing resource consumption and reduce delays in transmission of network traffic. For example, a network device that previously performed one or more resource intensive operations on a plurality of small packets may conserve processing resources by performing the operation(s) on a single batch packet. Delays in the transmission of network traffic may be reduced, for example, in situations where one batch packet can be processed faster than the individual network packets included in the batch packet would have otherwise been processed. Improvements in processing resource consumption and network speed may also enhance user experience (e.g., by reducing delays in the transmission of network packets).

As used herein, a packet may refer to a communication structure for communicating information, such as a protocol data unit (PDU), a packet, a frame, a datagram, a segment, a message, a block, a cell, a frame, a subframe, a slot, a symbol, a portion of any of the above, and/or another type of formatted or unformatted unit of data capable of being transmitted via a network.

Figure 1:
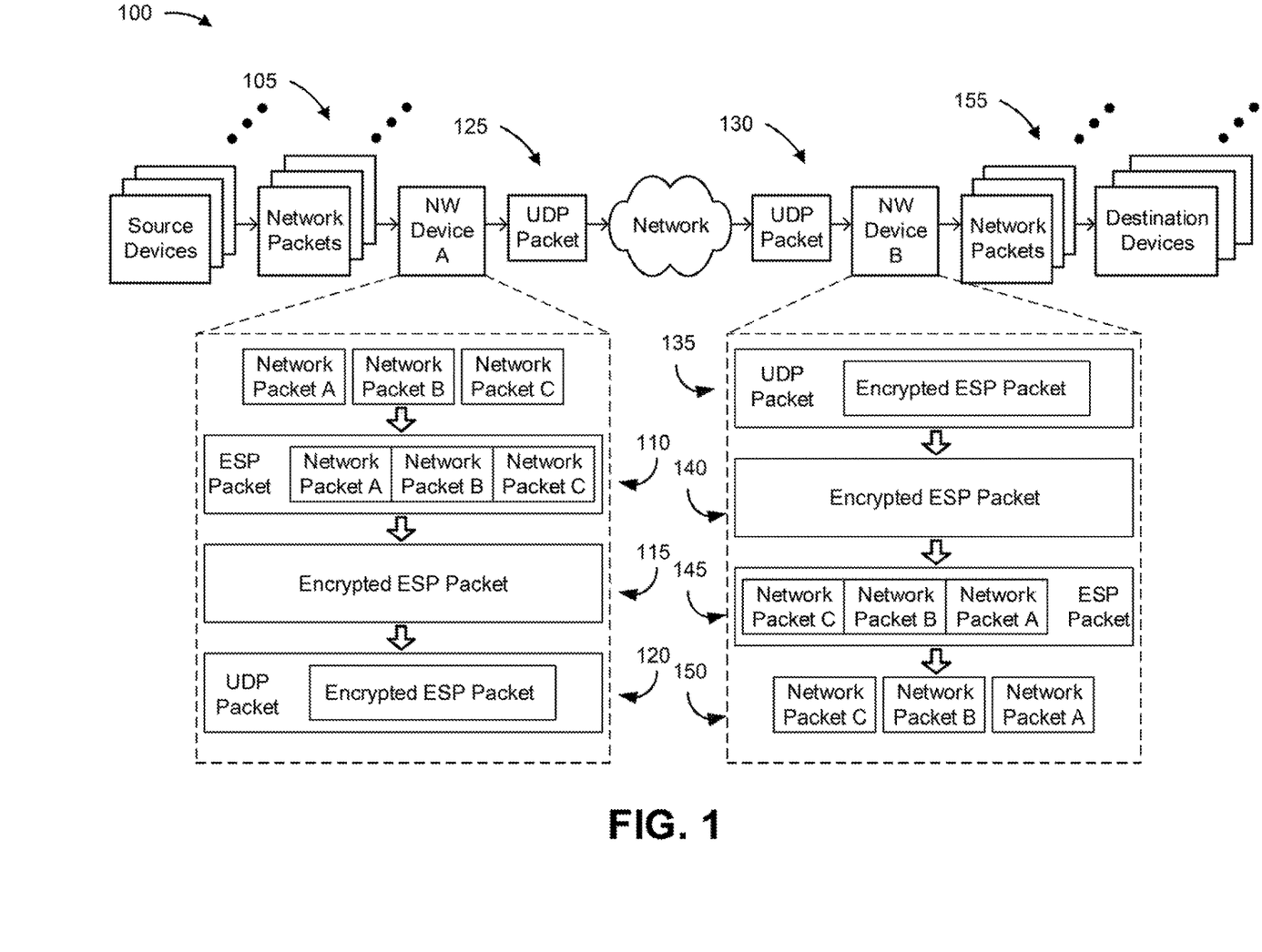
FIG. 1 is a diagram of an overview of an example implementation described herein.

FIG. 1 is a diagram of an overview of an example implementation 100 described herein. As shown in FIG. 1, example implementation 100 may include source devices (e.g., home computers, mobile phones, server computers, etc.) which may provide, via a network, data in the form of network packets (e.g., internet protocol (IP) packets) to destination devices (e.g., home computers, mobile phones, server computers, etc.). Example implementation 100 may further include network devices (e.g., network device A and network device B, as shown) which may be responsible for forwarding network packets and performing one or more operations, such as encryption, etc.). For example, network device A may forward network packets from the source devices to the network, and network device B may forward network packets from the network to the destination devices.

As shown in FIG. 1, and by reference number 105, the source devices may provide multiple network packets, which may be associated with any kind of network traffic, to network device A (e.g., a customer premises device, an internet service provider (ISP) device, an edge device, a core device, etc.). Network device A may receive the multiple network packets and identify, from the multiple network packets, a set of individual network packets (e.g., network packets A, B, and C) to be included in a batch packet, as explained herein. In some implementations, network device A may determine which network packets to include in the batch packet based on the destinations of the network packets.

As further shown in FIG. 1, and as shown by reference number 110, network device A may generate, based on the multiple network packets received by network device A, a batch packet including the set of individual network packets (network packets A, B, and C). For example, as shown, the batch packet may be an encapsulating security payload (ESP) packet (e.g., used for the Internet Protocol Security suite (IPsec)), which encapsulates the packet data that was included in the network packets A, B, and C. In some implementations, a batch packet may include a header that identifies itself as a batch packet. In some implementations, a payload of the batch packet may include information indicating the number of individual network packets included in the batch packet, and may include offset data identifying where each individual network packet begins within the batch packet.

As further shown in FIG. 1, and as shown by reference number 115, network device A may perform an operation on the batch packet. For example, as shown, network device A may perform encryption on the batch packet. In various implementations, network device A may perform different actions, such as any action that might benefit from processing one larger packet, rather than multiple smaller packets (e.g., in a manner designed to reduce processing resource consumption). For example, in this situation, network device A would have spent more resources encrypting network packets A, B, and C separately than encrypting the batch packet a single time.

As further shown in FIG. 1, and as shown by reference number 120, network device A may encapsulate the batch packet for transmission. For example, as shown, network device A may encapsulate the batch packet in a user datagram protocol (UDP) packet for transmission (e.g., via an IPsec tunnel to network device B via the network). In this situation, the header of the encapsulation packet can include information specifying that the encapsulation packet encapsulates a batch packet. For example, a destination port may be used to designate whether the type of packet encapsulated is a standard network packet or a batch packet.

As further shown in FIG. 1, and as shown by reference number 125, network device A may transmit the encapsulation packet (UDP packet) to network device B via a network. In the IPsec example provided above, the transmission may take place using an IPsec tunnel established between network device A and network device B. As shown by reference number 130, network device B may receive the encapsulation packet (UDP packet) from network device A via the network.

As further shown in FIG. 1, and as shown by reference number 135, network device B may identify that the UDP packet encapsulates a batch packet. For example, network device B may use the header information of the UDP packet to identify that the UDP packet encapsulates a batch packet. As shown by reference number 140, network device B may decapsulate the UDP packet or otherwise obtain the batch packet from the UDP packet.

As further shown in FIG. 1, and as shown by reference number 145, network device B may perform an action on the batch packet. Continuing with the example shown in which network device A performed encryption on the batch packet, network device B may perform decryption of the batch packet. In various implementations, network device B may perform different actions, such as any action that might benefit from processing one larger packet, rather than multiple smaller packets, as described above. In this example, network device B may have spent more resources decrypting network packets A, B, and C separately than decrypting the batch packet a single time.

As further shown in FIG. 1, and as shown by reference number 150, network device B may reconstruct the individual network packets from the batch packet. For example, network device B may use the information indicating the number of packets, and the offset data, included in the batch packet payload to extract the data of the original network packets and reconstruct the original network packets.

As further shown in FIG. 1, and as shown by reference number 155, network device B may transmit the individual network packets to their corresponding destination devices. Although the example described involves network devices, a different example may involve a different type of device, such a computer device. In addition, while the example described above involves an encryption and decryption process, a different action or actions may be performed based on batch packets.

In this way, the ability for a network device to generate batch packets and reconstruct original network packets from batch packets may reduce processing resource consumption and reduce delays in transmission of network traffic. For example, a network device that previously performed one or more resource intensive operations on a multiple small packets may conserve processing resources by performing the operation(s) on a single batch packet. Delays in the transmission of network traffic may be reduced, for example, in situations where one batch packet can be processed faster than the individual network packets included in the batch packet would have otherwise been processed. Improvements in processing resource consumption and network speed may also enhance user experience (e.g., by reducing delays in the transmission of network packets).

As indicated above, FIG. 1 is provided merely as an example. Other examples are possible and may differ from what was described with regard to FIG. 1.

Figure 2:
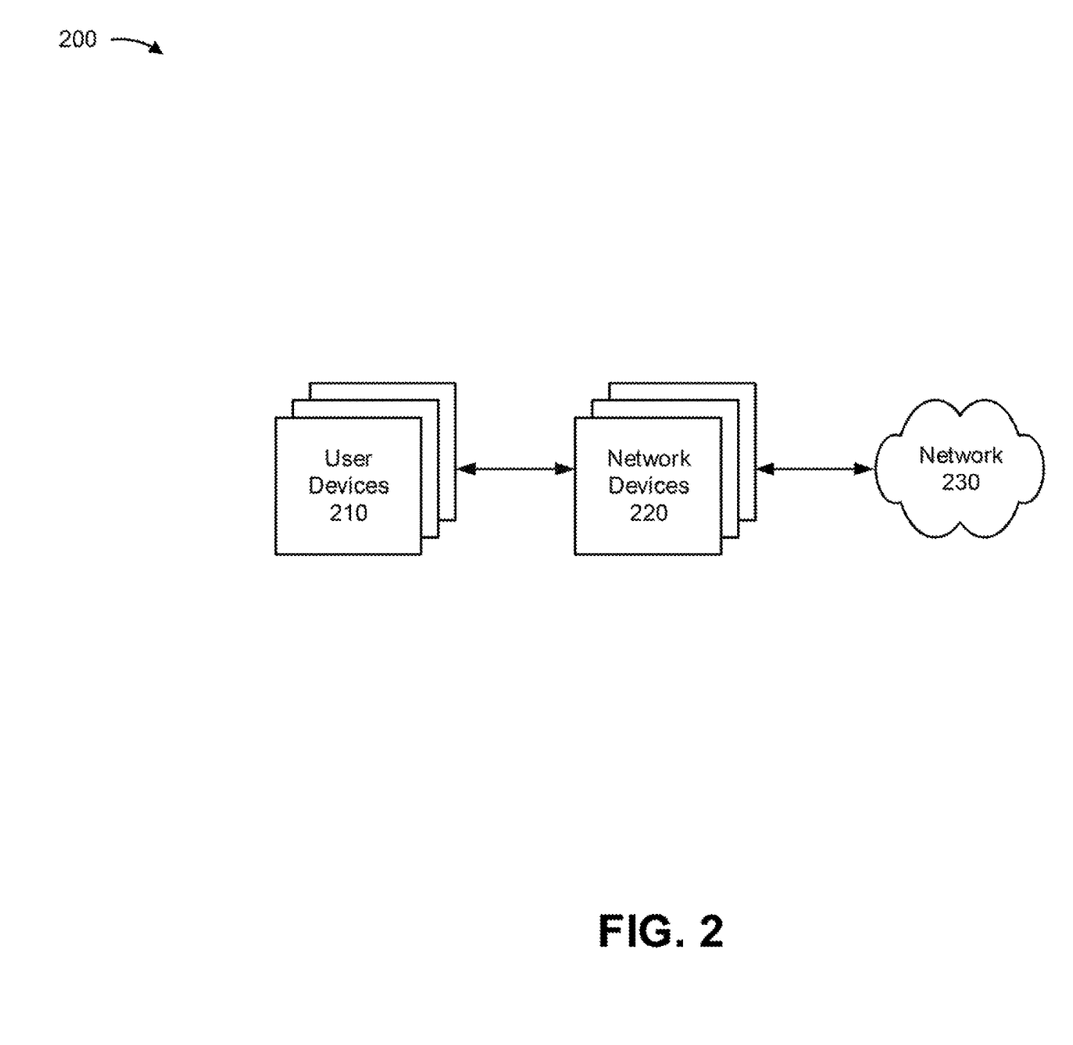
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 210, one or more network devices 220, and a network 230. Devices of environment 200 may interconnect via wired connections, wireless connections, or a combination of wired and wireless connections.

User device 210 includes one or more devices capable of receiving, generating, storing, processing, and/or providing information associated with network packets. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a personal computer, a server computer, or a similar type of device. User device 210 may include a variety of applications, such as a web browsing application, entertainment application, communications application, or the like, for generating internet protocol packets to be transmitted to and/or received from other user devices 210 via a network (such as network 230).

Network device 220 includes one or more devices capable of receiving, generating, storing, processing, and/or providing information related to batch packets. For example, network device 220 may include a firewall, a router, a gateway, a switch, a hub, a bridge, a reverse proxy, a server (e.g., a proxy server), a security device, an intrusion detection device, a load balancer, or a similar device. In some implementations, network device 220 may receive individual network packets and generate a batch packet using the individual network packets. Additionally, or alternatively, network device 220 may perform various actions and/or processes on batch packets, including encryption, decryption, load balancing, security scanning, or the like. In some implementations, network device 220 may be a physical device implemented within a housing, such as a chassis. In some implementations, network device 220 may be a virtual device implemented by one or more computer devices of a cloud computing environment or a data center. Although FIG. 2 shows a single network device 220, in practice, there may be hundreds, thousands, millions, etc. of network devices 220.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
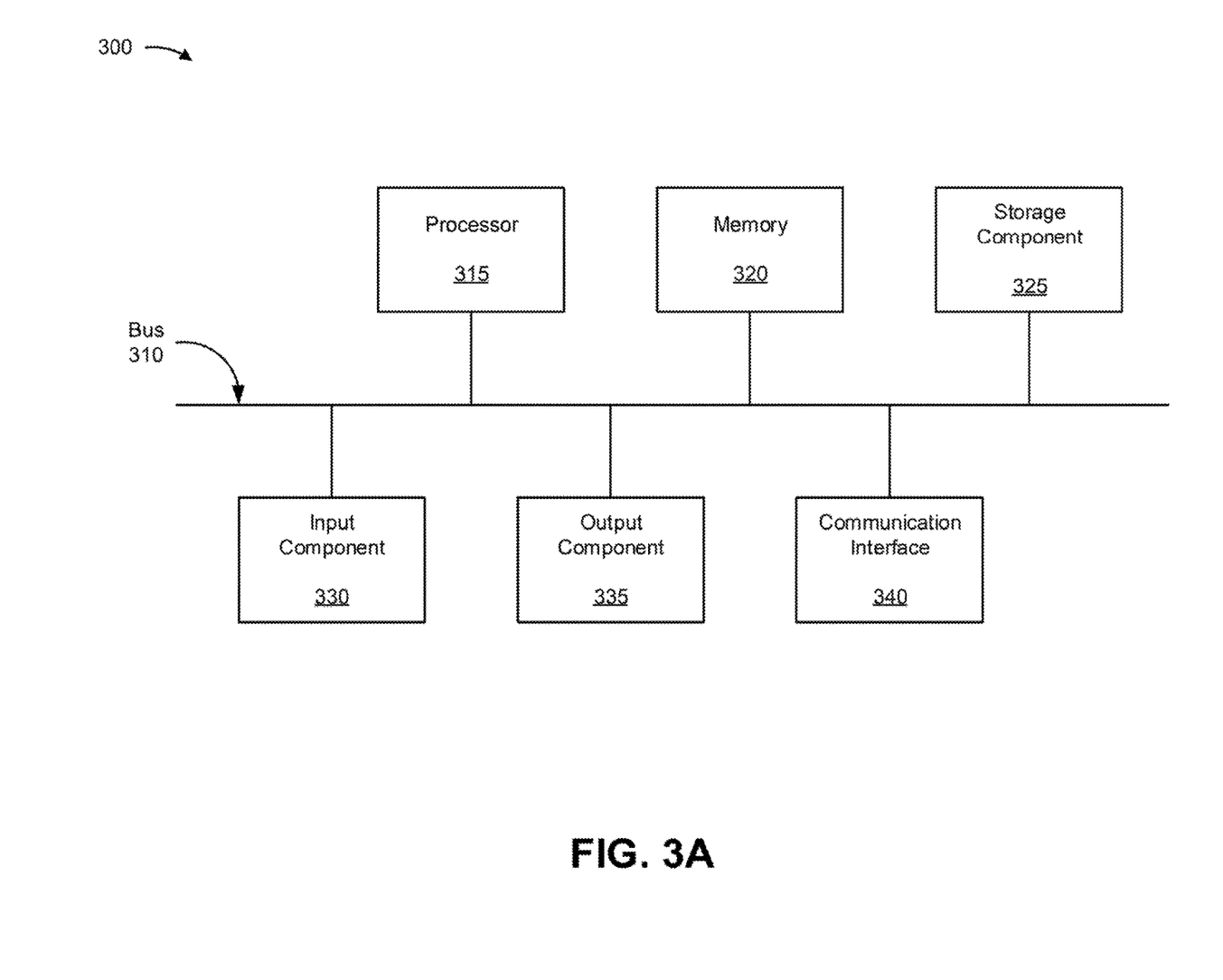
FIG. 3A is a diagram of example components of one or more devices of FIG. 2.

FIG. 3A is a diagram of example components of a device 300. Device 300 may correspond to user devices 210 and/or network devices 220. In some implementations, user devices 210 and/or network devices 220 may include one or more devices 300 and/or one or more components of device 300. As shown in FIG. 3A, device 300 may include a bus 310, a processor 315, a memory 320, a storage component 325, an input component 330, an output component 335, and a communication interface 340.

Bus 310 includes a component that permits communication among the components of device 300. Processor 315 is implemented in hardware, firmware, or a combination of hardware and software. Processor 315 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 315 includes one or more processors capable of being programmed to perform a function. Memory 320 includes a random access memory (RAM), a read only memory (ROM), and/or another type of dynamic or static storage device (e.g., a flash memory, a magnetic memory, and/or an optical memory) that stores information and/or instructions for use by processor 315.

Storage component 325 stores information and/or software related to the operation and use of device 300. For example, storage component 325 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 330 includes a component that permits device 300 to receive information, such as via user input (e.g., a touch screen display, a keyboard, a keypad, a mouse, a button, a switch, and/or a microphone). Additionally, or alternatively, input component 330 may include a sensor for sensing information (e.g., a global positioning system (GPS) component, an accelerometer, a gyroscope, and/or an actuator). Output component 335 includes a component that provides output information from device 300 (e.g., a display, a speaker, and/or one or more light-emitting diodes (LEDs)).

Communication interface 340 includes a transceiver-like component (e.g., a transceiver and/or a separate receiver and transmitter) that enables device 300 to communicate with other devices, such as via a wired connection, a wireless connection, or a combination of wired and wireless connections. Communication interface 340 may permit device 300 to receive information from another device and/or provide information to another device. For example, communication interface 340 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 315 executing software instructions stored by a non-transitory computer-readable medium, such as memory 320 and/or storage component 325. A computer-readable medium is defined herein as a non-transitory memory device. A memory device includes memory space within a single physical storage device or memory space spread across multiple physical storage devices.

Software instructions may be read into memory 320 and/or storage component 325 from another computer-readable medium or from another device via communication interface 340. When executed, software instructions stored in memory 320 and/or storage component 325 may cause processor 315 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

Figure 3B:
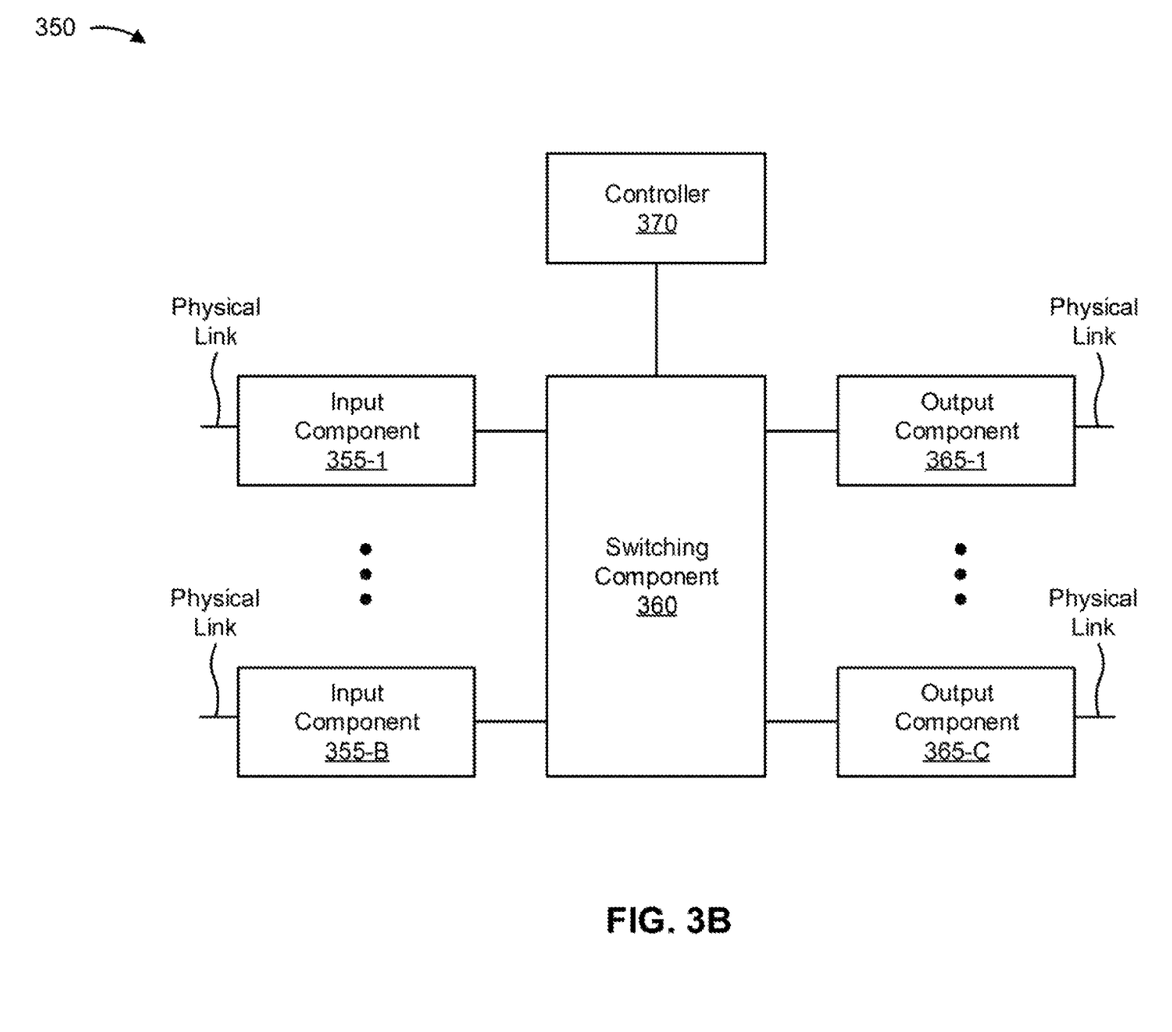
FIG. 3B is a diagram of example components of a device, such as one or more devices of FIG. 2.

FIG. 3B is a diagram of example components of a device, such as one or more devices of FIG. 2. Device 350 may correspond to user devices 210 and/or network devices 220. In some implementations, user devices 210 and/or network devices 220 may include one or more devices 350 and/or one or more components of device 350. As shown in FIG. 3B, device 350 may include one or more input components 355-1 through 355-B (B≥1) (hereinafter, and with respect to FIG. 3B, referred to collectively as input components 355, and individually as input component 355), a switching component 360, one or more output components 365-1 through 365-C (C≥1) (hereinafter, and with respect to FIG. 3B, referred to collectively as output components 365, and individually as output component 365), and a controller 370.

Input component 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. A processor is implemented in hardware, firmware, or a combination of hardware and software. In some implementations, controller 370 may include one or more processors that can be programmed to perform a function.

In some implementations, controller 370 may include a random access memory (RAM), a read only memory (ROM), and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 350 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350. In some implementations, various components of FIGS. 3A and 3B may be interchangeable in some devices, such as device 300 and/or device 350.

Figure 4:
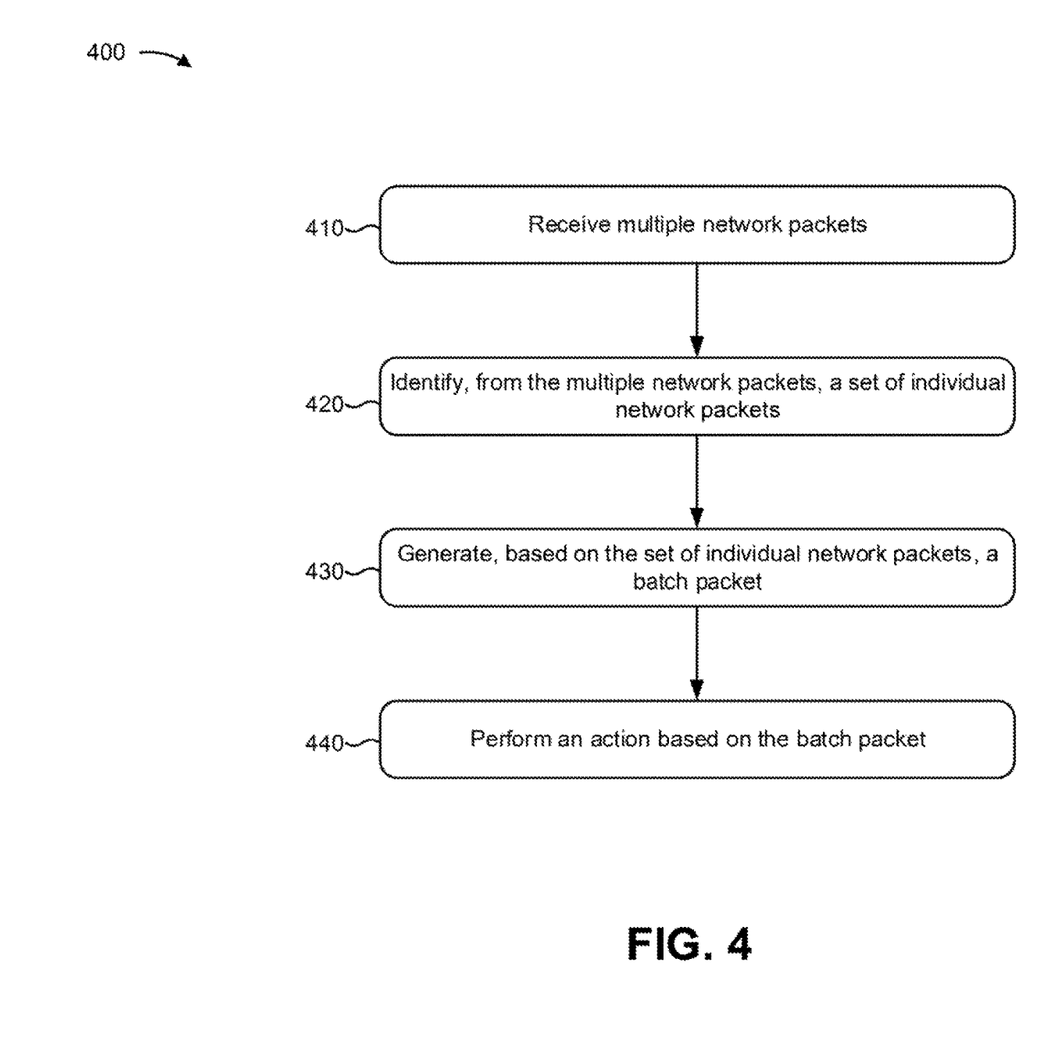
FIG. 4 is a flow chart of an example process for generating a batch packet for network communications.

FIG. 4 is a flow chart of an example process 400 for generating a batch network packet for network communications. In some implementations, one or more process blocks of FIG. 4 may be performed by network device 220. In some implementations, one or more process blocks of FIG. 4 may be performed by another device or a group of devices separate from or including network device 220, such as user device 210.

As shown in FIG. 4, process 400 may include receiving multiple network packets (block 410). For example, network device 220 may receive multiple network packets. In some implementations, network device 220 may receive the network packets from one or more user devices 210. The network packets may have been sent for a variety of purposes and include a variety of different types of packets, such as hypertext markup language (HTML) packets, network messaging packets, micro-blog packets, Internet of Things (IoT) packets, audio packets, video packets, or the like.

In some implementations, the network packets may include IP packets. In some implementations, the network packets may be addressed to a variety of different destinations. In some implementations, the multiple network packets may also be of varying sizes (e.g., up to the maximum transmission unit (MTU) for the devices operating on network 230). In some implementations, network device 220 may receive the multiple network packets in a manner designed to facilitate transmission of the network packets from one user device 210 to another, which may include performing one or more operations on the network packets (e.g., encryption, security inspection, load balancing, or the like).

In this way, network device 220 may receive multiple network packets, enabling network device 220 to identify, from the set of multiple network packets, a set of individual network packets that may be included in a batch packet.

As further shown in FIG. 4, process 400 may include identifying, from the multiple network packets, a set of network packets (block 420). For example, network device 220 may identify, from the multiple network packets, a set of individual network packets that may be included in a batch packet. In various implementations, network device 220 may identify the set of individual network packets based on a variety of criteria. For example, network device 220 may identify the set of individual network packets based on the size of the network packets and/or the destination of the network packets.

In some implementations, network device 220 may identify the set of individual network packets based on the destination of the network packets. For example, network device 220 may obtain the destination from header information of network packets, e.g., from a destination address or the like. Additionally, or alternatively, network device 220 may determine a packet destination device (e.g., another network device 220 or user device 210 that will receive the packets) based on a routing table. For example, an Internet service provider (ISP) may have information that particular packets are destined for a particular location serviced by a particular other network device 220 or a particular set of other network devices 220, so network device 220 may use that information to identify the particular packets as a set of individual network packets for inclusion in a batch packet (e.g., because the particular packets are destined for the same destination).

In some implementations, network device 220 may identify the set of individual network packets based on the size of the network packets. For example, network 230 may have an MTU, which may vary based on network 230, devices included in network 230, and/or protocol(s) used by network 230 and/or network devices 220. In this situation, network device 220 may have or be provided with the MTU (e.g., by an administrator, based on the MTU of network device 220, or based on the MTU of a communications protocol). Based on the size of each network packet received (e.g., as identified in the header), network device 220 may identify a set of individual network packets where the sum of the sizes of the individual network packets is less than the MTU. By way of example, for a network with an MTU of 1500 bytes, network device 220 may identify a set of individual network packets, where the sum of the sizes of the identified individual network packets is less than the 1500 bytes. In some implementations, network device 220 may leave room for additional information (e.g., a fixed amount of bytes free for information to be included in the batch packet, such as information identifying the number of individual network packets in the batch packet, and/or individual network packet offset data).

In some implementations, network device 220 may identify the set of individual network packets based on an order in which the network packets are received by network device 220. For example, network device 220 may attempt to identify network packets that are proximate to each other in terms of time received. As another example, network device 220 may identify a set of individual network packets that preserves monotonically increasing sequence numbers (e.g., monotonically increasing sequence numbers assigned by user device 210 that sent the individual network packet(s) and/or assigned by network device 220 upon receipt of the individual network packet(s)).

In some implementations, network device 220 may identify the set of individual network packets by analyzing network packets to determine which network packets may be best suited for identification as a set of individual network packets (e.g., to be included in a batch packet, as described in further detail below). For example, network device 220 may analyze network packets based on packet size, destination, and order, to determine a score for the network packets, the score indicating which packets would be best for including in a batch packet. The analysis may be performed by a machine learning model (e.g., a machine learning model trained using previous instances of network device 220 identifying sets of individual network packets).

While identification of the set of individual network packets by network device 220 is described above with respect to three separate criteria for identifying the set of individual network packets, network device 220 may use a combination of this criteria, additional criteria, different criteria, or the like, when identifying the set of individual network packets. For example, network device 220 may identify the set of individual network packets based on a network device 220 that is a next hop in a transmission path of the network packets. For example, network device 220 may identify network packets that are to be transmitted to a same next hop network device 220.

In this way, network device 220 may identify, from the multiple network packets, a set of individual network packets that may be included in a batch packet, enabling network device 220 to be able to generate a batch packet based on the set of individual network packets identified.

As further shown in FIG. 4, process 400 may include generating, based on the set of network packets, a batch packet (block 430). For example, network device 220 may generate, based on the set of individual network packets, a batch packet. In some implementations, the batch packet may be an internet protocol packet, which may take a variety of forms, such as a transmission control protocol (TCP) packet, a user datagram protocol (UDP) packet, an ESP packet, or the like.

In some implementations, network device 220 may generate the batch packet by including, in the batch packet, data included in the set of individual network packets (e.g., including header data and payload data for each of the network packets included in the set). Additionally, or alternatively, network device 220 may include, in the batch packet, data identifying the number of individual network packets included in the batch packet (e.g., the number of packets in the set of individual network packets) and data identifying the offset of each of the individual network packets included in the batch packet.

For example, network device 220 may create a batch packet by including, in the batch packet, one byte for a value identifying the number of individual network packets in the batch packet, 2 bytes for identifying a first offset of a first individual network packet in the batch packet, 2 bytes for identifying a second offset of a second individual network packet in the batch packet, and so on until identifying an Nth offset of an Nth individual network packet, and then including, in the batch packet, the first individual network packet (at the first offset), the second individual network packet (at the second offset), and so on until including the Nth individual network packet (at the Nth offset).

In some implementations, network device 220 may generate a batch packet by removing header data for at least one of the individual network packets included in the batch packet. By way of example, header data for one packet may be very similar to another packet included in the batch packet (e.g., in a situation where the individual network packets were part of a data stream from the same user device 210). In this situation, network device may remove or replace header data for one or more of the individual network packets with similar headers, and add data indicating which header or headers were removed and include data needed to reconstruct the headers from the similar headers. For example, network device 220 may include, in the offset for a first individual network packet of a batch packet, an identifier that indicates a second individual network packet that follows the first individual network packet has had its header data removed. The identifier included in the offset may further include data indicating the difference between the header of the first individual network packet and the header of the second individual network packet, e.g., enabling a recipient to determine which data should be included in the header of the second individual network packet. As another example, header data for the second individual network packet may be replaced with data identifying the offset of a similar header and data identifying differences between the similar header and the header of the second individual network packet. Removing and/or replacing header data may enable network device 220 to reduce the size of network packets being transmitted and/or enable more network packets to be included in a batch packet, which may increase network packet transmission resource efficiency (e.g., by consuming less bandwidth for sending less data, or the like).

In some implementations, network device 220 may generate a batch packet that is organized in a manner different from that described above. For example, network device 220 may generate a batch packet with a different layout and/or a different amount of space (e.g., bytes) dedicated in the batch packet for the number of packets and offsets (e.g., the number of packets and/or the offsets could be at the end of the packet, in a separate packet, or the like).

Batch packets may be of variable size and may include portions of predetermined and/or varying sizes. For example, the size of the portion of the batch packet that identifies the number of individual network packets included in the batch packet may be predetermined or may vary. As another example, the size of the portion of the batch packet that identifies each offset may be predetermined or may vary. Additionally, or alternatively, the size of the portion of the batch packet that includes individual network packet data may vary, e.g., based on the size of the individual network packets included in the batch packet. In some implementations, network device 220 may pad the batch packet (e.g., by filling the batch packet to the size of the MTU with random data). For example, network device 220 may pad the batch packet to prepare for performing an operation on the batch packet (such as encryption).

In some implementations, network device 220 may include a variety of information in the header of the batch packet. For example, network device 220 may include, in the header of the batch packet, a destination that matches destinations for the packets included in the batch packet, an identifier that identifies the batch packet as a batch packet to a recipient (e.g., a destination port field of the header can include particular data that identifies the batch packet as a batch packet), or the like. The destination may be a user device 210, another network device 220, or a network of user devices 210 and/or network devices 220, such as network 230.

In this way, network device 220 may generate a batch packet based on the set of individual network packets, enabling network device 220 to perform an action based on the batch packet.

As further shown in FIG. 4, process 400 may include performing an action based on the batch packet (block 440). For example, network device 220 may perform an action based on the batch packet. In some implementations, network device 220 may perform a variety of actions based on the batch packet. In some implementations, network device 220 may perform more than one action based on the batch packet. For example, the action may include any action capable of being performed by network device 220 on any IP packet, such as encryption, decryption, encapsulation, malware scanning, transmission, or the like.

As an example, network device 220 may encrypt the batch packet in a manner designed to secure transmission of the batch packet (and the packets included in the batch packet) from network device 220 to another network device 220 that will decrypt the batch packets. As a specific example, network device 220 may perform encryption and encapsulation of the batch packet, such that the batch packet can be transmitted to another network device 220 using IPsec and ESP (e.g., using an IPsec tunnel between network device 220 and the other network device 220).

In some implementations, network device 220 may perform one or more load balancing operations on the batch packet. For example, network device 220 may be responsible for load balancing network communications for a variety of devices, which may include re-arranging the order in which network packets are transmitted from network device 220 (or other network devices 220). Batch packets may be included in the load balancing processes performed by network device 220, e.g., to be processed in a manner similar to other non-batch network packets that are also subject to the load balancing process(es).

As another example action, network device 220 may encapsulate the batch packet in a manner designed to enable the batch packet to be transmitted using a particular protocol. As a specific example, network device 220 may encapsulate the batch packet in an ESP packet. In this situation, the ESP packet header may include data that identifies the encapsulated packet as a batch packet (e.g., in a manner designed to inform a recipient of the packet, such as another network device 220, that the ESP packet encapsulates a batch packet). For example, a destination port of the ESP packet may be a predefined port number that indicates that the ESP packet includes the batch packet. In some implementations, other forms of encapsulation may be used, such as UDP encapsulation.

In some implementations, network device 220 may perform one or more security operations on the batch network packet. For example, network device 220 may be capable of performing intrusion detection operations, malware scanning operations, or the like, on network packets. In this situation, network device 220 may perform the security operations on the batch packet in a manner similar to performance of the security operations on non-batch network packets, e.g., in a manner designed to detect potential malware or other malicious activity.

As another example action, network device 220 may cause transmission of the batch network packet (e.g., before or after performing other operations, such as encryption and/or encapsulation). As a specific example, network device 220 may cause transmission over network 230 to a destination network device 220 capable of handling the batch packet in a manner designed to ensure the individual network packets included in the batch packet are routed to their intended destination(s).

As noted above, network device 220 may perform other actions based on the batch packet, in addition to or as an alternative to the actions described above.

In this way, network device 220 may perform an action based on the batch packet, enabling network device 220 to process batch packets in a manner designed to be more efficient than separately processing the individual network packets included in the batch packets.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
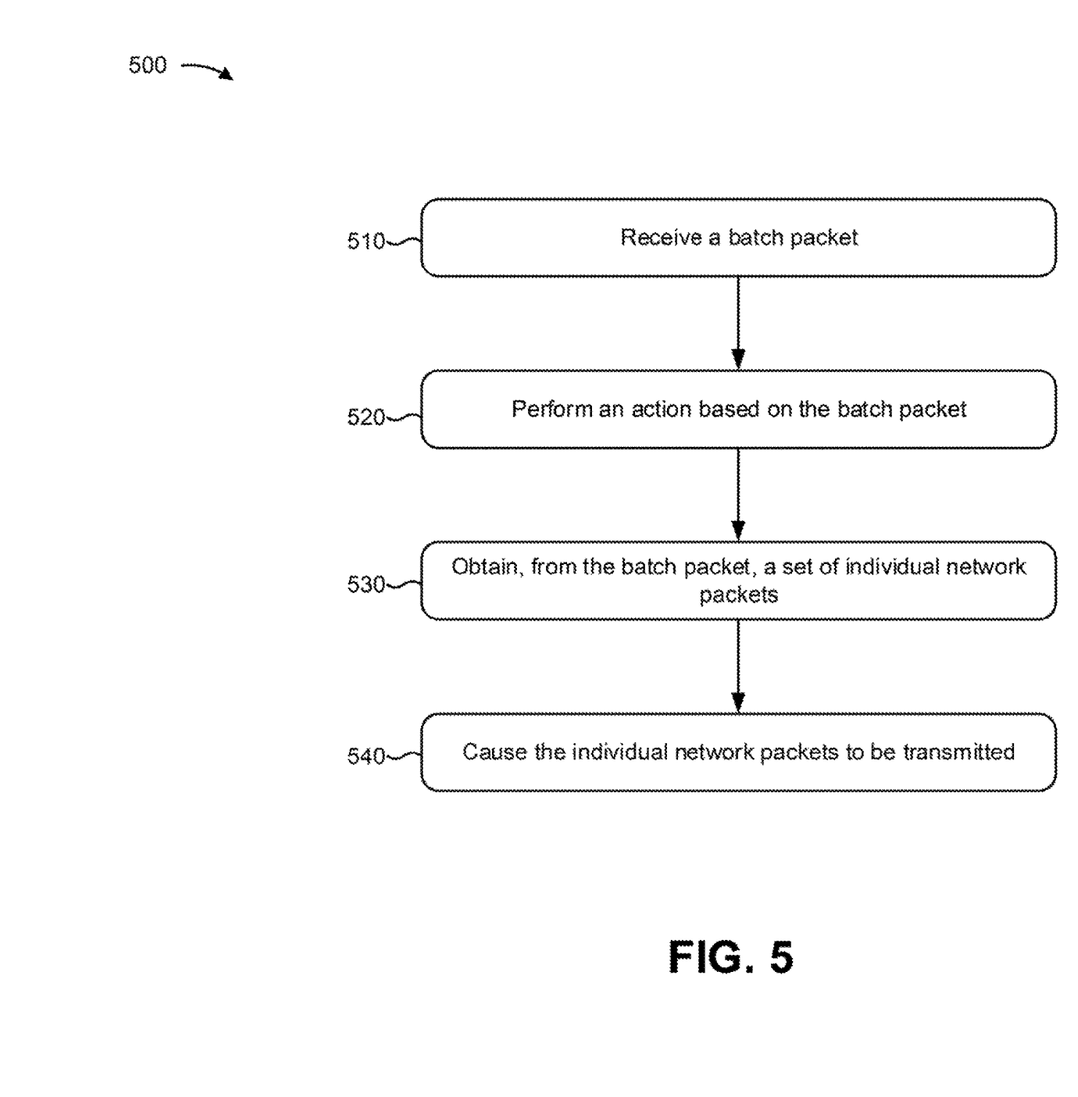
FIG. 5 is a flow chart of an example process for handling a batch packet for network communications.

FIG. 5 is a flow chart of an example process 500 for handling a batch packet for network communications. In some implementations, one or more process blocks of FIG. 5 may be performed by network device 220. In some implementations, one or more process blocks of FIG. 5 may be performed by another device or a group of devices separate from or including network device 220, such as user device 210.

As shown in FIG. 5, process 500 may include receiving a batch packet (block 510). For example, network device 220 may receive a batch packet. In some implementations, the batch packet may have been sent by another network device 220 via network 230. In some implementations, the batch packet may have been generated in a manner similar to that described above (e.g., at block 430). Additionally, or alternatively, the batch packet may have been previously processed by another network device, such as in a manner similar to that described above (e.g., at block 440). By way of example, the batch packet may have been encrypted and encapsulated in an ESP packet that was transmitted to network device 220 via an IPsec tunnel.

In various implementations, network device 220 may receive the batch packet for a variety of reasons. For example, network device 220 may include a routing device that receives the batch packet in a manner designed to route the individual network packets included in the batch packet to the intended destinations of the individual network packets. As another example, network device 220 may include an encryption device that receives the batch packet in a manner designed to encrypt the individual network packets included in the batch packet. As another example, network device 220 may include a decryption device that receives the batch packet in a manner designed to decrypt the individual network packets included in the batch packet. As another example, network device 220 may include a load balancer device that receives the batch packet in a manner designed to perform load balancing on the individual network packets included in the batch packet. As another example, network device 220 may include a network security device that receives the batch packet in a manner designed to perform network security operations on the individual network packets included in the batch packet, such as firewall operations, malware scanning, content filtering, intrusion detection, or the like. In various implementations, network device 220 may receive the batch packet for any one or more of the foregoing purposes, and/or for another purpose or purposes.

In various implementations, network device 220 may determine that the batch packet is a batch packet in a variety of ways. For example, a header of an encapsulation packet (e.g., an ESP or UDP packet) may include data identifying the payload of the encapsulation packet as a batch packet. As another example, header data of the batch packet itself may include data identifying itself as a batch packet. As another example, network device 220 may inspect the network packet to identify data indicating the network packet is a batch packet. In this situation, the data may include information expected to be in the payload of the batch packet, such as an identifier included at a particular offset of the payload of the batch packet.

In this way, network device 220 may receive a batch packet, enabling network device 220 to perform an action based on the batch packet.

As further shown in FIG. 5, process 500 may include performing an action based on the batch packet (block 520). For example, network device 220 may perform an action based on the batch packet. In various implementations, network device 220 may perform a variety of actions based on the batch packet and, in some implementations, may perform more than one action based on the batch packet. Actions may include any action capable of being performed by network device 220 on any IP packet, such as encryption, decryption, encapsulation, malware scanning, transmission, or the like.

In some implementations, network device 220 may use data included in the batch packet, or data included in an encapsulation packet, to determine which action or actions to be performed. For example, header data may indicate (e.g., using data included in the destination port field or another field) that the batch packet is encrypted. In this situation, network device 220 may decrypt the batch packet.

In some implementations, other actions may also be performed by network device 220, including and/or corresponding to one or more of the actions described above (e.g., with reference to block 440). As an example, network device 220 may decapsulate the batch packet (e.g., separately from or in addition to one or more other actions) in situations where the batch packet was encapsulated (e.g., as described with reference to block 440).

In some implementations, network device 220 may perform the action in a manner designed to take advantage of the batch packet. For example, network device 220 may perform an action that may be more efficiently performed on one large packet than separately on multiple smaller packets.

In this way, network device 220 may perform an action based on the batch packet, enabling network device 220 to be able to obtain the individual network packets from the batch packet.

As further shown in FIG. 5, process 500 may include obtaining, from the batch packet, multiple network packets (block 530). For example, network device 220 may obtain, from the batch packet, a set of individual network packets. In some implementations, the set of individual network packets may have been included in the batch packet by another network device 220 (e.g., in a manner similar to that described above with reference to block 430).

In various implementations, network device 220 may obtain the set of individual network packets in a variety of ways, which may depend, for example, on the manner in which the batch packet was generated. For example, network device 220 may obtain the set of individual network packets using data included in the batch packet, such as data indicating the number of individual network packets in the batch packet and the offsets of the individual network packets. In some implementations, network device 220 may examine first bytes of the payload for the above data, or may examine another portion of the batch packet, depending on how the batch packet was generated. In this situation, network device 220 may identify how the batch packet was generated based on data associated with the batch packet, such as header data specifying how the batch packet is organized. Additionally, or alternatively, network device 220 may determine how the batch packet was generated based on a predetermined method of generating batch packets.

In some implementations, network device 220 may reconstruct the individual network packets that were included in the batch packet. For example, network device 220 may use a first offset to identify where an individual network packet begins, and a second offset to identify where the individual network packet ends. In this situation, the data between the offset locations may include both header and payload information for an individual network packet, which network device 220 may parse to separate the header information from other payload information. After identifying the header and payload information for an individual network packet, network device 220 may reconstruct the individual network packet (e.g., generate a new packet with the header information and payload information obtained from the batch packet). Network device may use the offset information included in the batch packet to identify all of the individual network packets included in the batch packet, and then reconstruct each of the individual network packets.

In some implementations, network device 220 may, when reconstructing the individual network packets that were included in the batch packet, identify individual network packets for which header data was removed or replaced (e.g., as described above with reference to block 430). For example, data included in the batch packet may identify, for a particular network packet, that header data for that particular network packet was removed. The data may also identify a similar header for a second network packet included in the batch packet, and the data may further identify differences between the header data of the particular network packet and the second network packet. For example, the data may identify a different packet sequence number as the only difference between the header of the particular network packet and the second network packet, which may enable network device 220 to reconstruct the header for the particular network packet using the header information of the second network packet.

In this way, network device 220 may obtain, from the batch packet, a set of individual network packets, enabling network device 220 to cause transmission of the individual network packets obtained from the batch packet.

As further shown in FIG. 5, process 500 may include causing the multiple network packets to be transmitted (block 540). For example, network device 220 may cause the individual network packets obtained from the batch packet to be transmitted. The individual network packets may be transmitted, for example, in accordance with routing and/or addressing information, which may be included in the headers of the individual network packets or otherwise obtained by network device 220 (e.g., from a routing table accessible to network device 220).

For example, in a situation where network device 220 includes a routing device, network device 220 may cause transmission of the individual network packets by routing the individual network packets to their intended destinations (e.g., user device(s) 210, network(s), other network device(s) 220, or the like). In some implementations, other types of network devices 220 may cause transmission of the individual network packets in other ways, such as via network 230 or a separate network (e.g., a LAN or WAN). In this situation, network device 220 may transmit the individual network packets to other network devices 220 or other user devices 210.

In this way, network device 220 may cause the individual network packets obtained from the batch packet to be transmitted, enabling network device 220 to handle individual network packets in a manner designed to ensure that network device 220 operations designed to batch and unbatch individual network packets result in more efficient network packet transmissions than separately processing and transmitting the individual network packets included in the batch packets.

In some implementations, network device 220 may perform other operations on individual network packets, e.g., in addition to or in the alternative to transmitting the individual network packets. For example, in some situations a process capable of being performed by network device 220 may be more efficiently performed on multiple smaller individual network packets than on one larger batch packet. In this situation, network device 220 may perform one or more operations on the batch packet (e.g., operations that may be more efficiently performed on the batch packet than the individual network packets included in the batch packet) and later perform one or more operations on the individual network packets obtained from the batch packet (e.g., operations that may be more efficiently performed on the individual network packets than on the batch packet).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
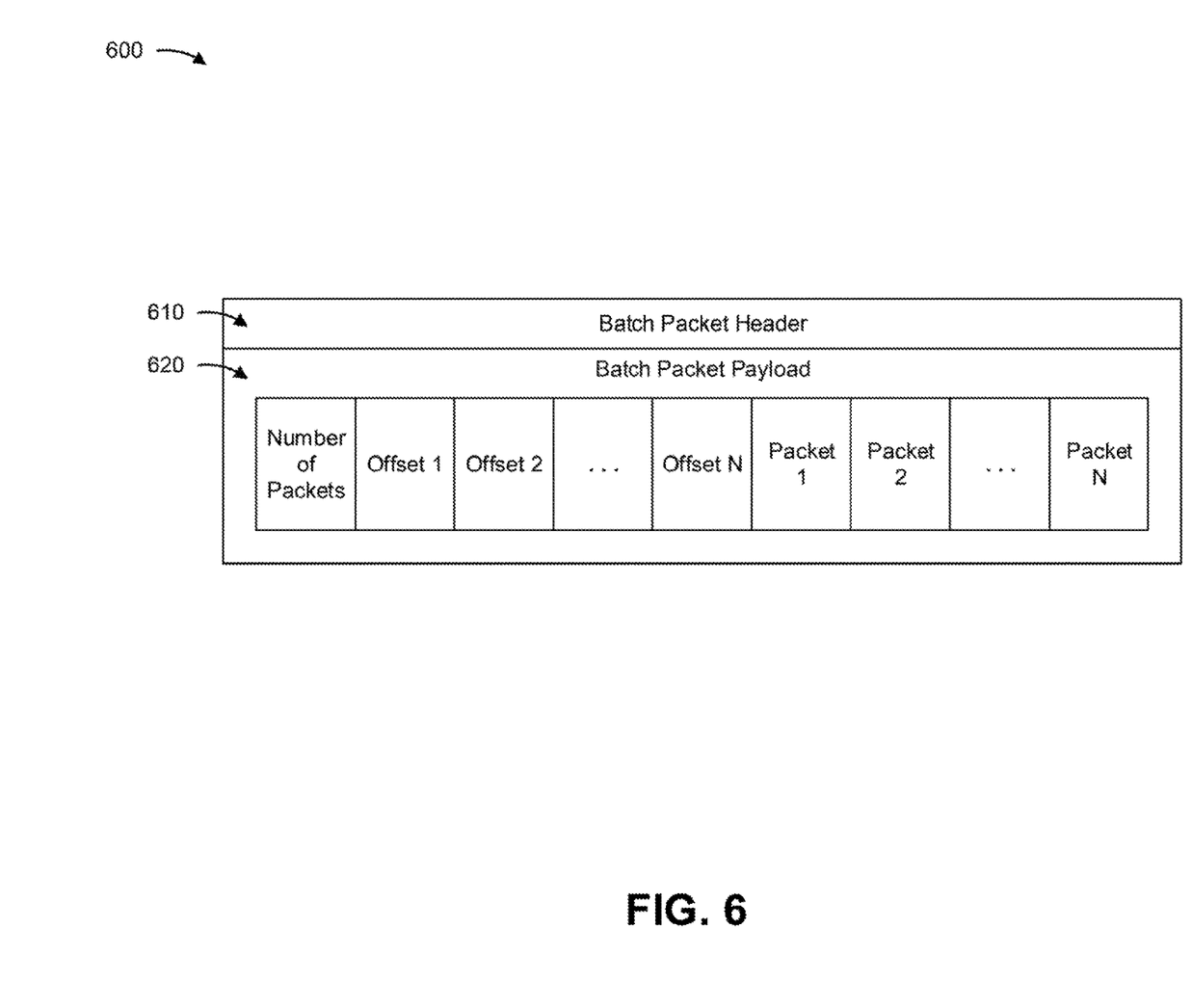
FIG. 6 is a diagram of an example implementation relating to the example processes shown in FIGS. 4 and 5.

FIG. 6 is a diagram of an example implementation 600 relating to the example processes 400 and 500 shown in FIGS. 4 and 5. FIG. 6 show an example of a batch packet.

As shown in FIG. 6, example implementation 600 includes an example batch packet, such as may be generated in accordance with block 430, and/or received in accordance with block 510, described herein. The example batch packet includes a batch packet header 610 and a batch packet payload 620.

In some implementations, batch packet header 610 may include data identifying the batch packet as a batch packet that includes a set of individual network packets. For example, a destination port field of batch packet header 610 may identify the batch packet as a batch packet that includes a set of individual network packets.

In some implementations, as shown, batch packet payload 620 may include a portion for identifying the number of individual network packets included in the batch packet. For example, batch packet payload 620 may include 1 byte for a value indicating a number of individual network packets included in the batch packet.

Following the portion identifying the number of individual network packets, as shown, batch packet payload 620 may include offsets identifying where each individual network packet begins within the batch packet. For example, where the batch packet includes individual network packets 1 through N, batch packet payload 620 may include offsets 1 through N. In this situation, for example, batch packet payload 620 may include 2 bytes for a value representing each offset.

Following the offsets, batch packet payload 620 may include the network packet data for individual network packets 1 through N. For example, batch packet payload 620 may include header information for each of the individual network packets, starting at a location indicated by each corresponding offset (e.g., individual network packet 1 may start at offset 1, individual network packet 2 may start at offset 2, and so on).

As indicated above, FIG. 6 is provided merely as an example. Other examples are possible and may differ from what was described with regard to FIG. 6.

Some implementations, described herein, provide a network device 220 that is capable of receiving multiple network packets, identifying (from the multiple network packets) a set of individual network packets that can be combined into a batch packet, generating a batch packet that includes the identified set of individual network packets, and performing an action based on the batch packet (such as encrypting the batch packet). In some implementations, a network device 220 that receives the batch packet can perform an action (such as decrypting the batch packet) and reconstruct the original set of individual network packets from the batch packet before causing transmission of the original network packets to their intended destinations.

In this way, the ability for a network device 220 to generate batch packets and reconstruct individual network packets from batch packets may reduce processing resource consumption and reduce delays in transmission of network traffic. For example, a network device 220 that previously performed one or more resource intensive operations on multiple small packets may conserve processing resources by performing the operation(s) on a single batch packet. Delays in the transmission of network traffic may be reduced, for example, in situations where one batch packet can be processed faster than the individual network packets included in the batch packet would have otherwise been processed. Improvements in processing resource consumption and network speed may also enhance user experience (e.g., by reducing delays in the transmission of network packets).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. As used herein, the term "or the like" is intended to be inclusive (e.g., as in "and/or the like"), unless explicitly stated otherwise. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, including,
one or more memories; and
one or more processors, communicatively coupled to the one or more memories, to:
receive, from at least one user device, multiple network packets;
identify, from the multiple network packets, a set of individual network packets,
the set of individual network packets including at least two of the multiple network packets, the at least two of the multiple network packets being destined for a particular destination device, and where the one or more processors, when identifying the set of individual network packets, are further to:

determine, based on a routing table accessible to the device and header data associated with each of the at least two of the multiple network packets, a network packet destination for each of the at least two of the multiple network packets; and identify the set of individual network packets based on each network packet destination determined for each of the at least two of the multiple network packets;

generate, based on the set of individual network packets, a batch packet, the batch packet including:

the set of individual network packets, data identifying a number of individual network packets included in the set of individual network packets, and offset data for each of the individual network packets included in the batch packet; and perform an action based on the batch packet.

2. The device of claim 1, where the one or more processors, when identifying the set of individual network packets, are further to:

identify the set of individual network packets based on a network packet size associated with each of the individual network packets.

3. The device of claim 2, where the one or more processors, when identifying the set of individual network packets, are further to:

identify the set of individual network packets based on a maximum transmission unit associated with the device.

4. The device of claim 1, where the at least two of the multiple network packets included in the set of individual network packets are from a single user device.

5. The device of claim 1, where the at least two of the multiple network packets included in the set of individual network packets are from different user devices.

6. A non-transitory computer-readable medium storing instructions, the instructions comprising:

one or more instructions that, when executed by one or more processors of a device, cause the one or more processors to:

receive, from a network device, a batch packet, the batch packet including:

a set of individual network packets, data identifying a number of individual network packets included in the set of individual network packets, and offset data for each of the individual network packets included in the batch packet;

perform an action based on the batch packet;

obtain, from the batch packet, the set of individual network packets, each individual network packet, of the set of individual network packets, having been obtained from the batch packet based on the offset data for the individual network packet included in the batch packet;

determine, based on a routing table accessible to the device and header data associated with each packet of the set of individual network packets, a network packet destination for each packet of the set of individual network packets; and cause the set of individual network packets to be transmitted toward at least one user device based on the network packet destination determined for each packet of the set of individual network packets.

7. The non-transitory computer-readable medium of claim 6, where the one or more instructions, when executed by the one or more processors, further cause the one or more processors to:

determine that the batch packet is the batch packet based on header data associated with the batch packet.

8. The non-transitory computer-readable medium of claim 7, where the one or more instructions, that cause the one or more processors to determine that the batch packet is the batch packet, further cause the one or more processors to:

determine that the batch packet is the batch packet based on an identifier included in a destination port field of the batch packet.

9. The non-transitory computer-readable medium of claim 6, where the one or more instructions, when executed by the one or more processors, further cause the one or more processors to:

determine, based on header data associated with an encapsulation packet, that the batch packet is encapsulated in the encapsulation packet.

10. The non-transitory computer-readable medium of claim 9, where the one or more instructions, that cause the one or more processors to perform the action, further cause the one or more processors to:

decapsulate the batch packet from the encapsulation packet.

11. The non-transitory computer-readable medium of claim 6, where the one or more instructions, when executed by the one or more processors, further cause the one or more processors to:

determine that the batch packet is encrypted; and decrypt the batch packet.

12. The non-transitory computer-readable medium of claim 6, where the one or more instructions, that cause the one or more processors to cause the set of individual network packets to be transmitted to the at least one user device, cause the one or more processors to:

cause transmission, to a first user device of the at least one user device, of a first network packet of the set of individual network packets; and cause transmission, to a second user device of the at least one user device, of a second network packet of the set of individual network packets.

13. The non-transitory computer-readable medium of claim 6, where the one or more instructions, that cause the one or more processors to obtain, from the batch packet, the set of individual network packets, cause the one or more processors to:

identify, based on the offset data included in the batch packet, individual network packet data for each individual network packet included in the set of individual network packets; and reconstruct, using the individual network packet data, each individual network packet included in the set of individual network packets.

14. A method, comprising:

receiving, by a first network device and from at least one user device, multiple network packets;

identifying, by the first network device and from the multiple network packets, a set of individual network packets, the set of individual network packets including at least two of the multiple network packets, the at least two of the multiple network packets being destined for a destination device, and where identifying the set of individual network packets comprises:

determining, based on a routing table accessible to the first network device and header data associated with each of the at least two of the multiple network packets, a network packet destination for each of the at least two of the multiple network packets; and identifying the set of individual network packets based on the network packet destination determined for each of the at least two of the multiple network packets;

generating, by the first network device and based on the set of individual network packets, a batch packet, the batch packet including:

the set of individual network packets, and offset data identifying a location of each individual network packet included in the set of individual network packets included in the batch packet; and performing, by the first network device, an action based on the batch packet.

15. The method of claim 14, where performing the action includes one or more of:

performing a load balancing operation on the batch packet;

performing an intrusion detection operation on the batch packet;

performing a malware scan on the batch packet;

encrypting the batch packet;

encapsulating the batch packet; or transmitting the batch packet.

16. The method of claim 14, where the batch packet includes:

a portion of a predefined size, the portion including data identifying a number of individual network packets included in the set of individual network packets.

17. The method of claim 14, where the batch packet includes:

a portion of variable size, the portion including the offset data, and the variable size being based on a number of individual network packets included in the set of individual network packets.

18. The method of claim 14, where identifying the set of individual network packets includes:

determining that a sum of a size, of each individual network packet included in the set of individual network packets, does not exceed a maximum transmission unit size for network communications between the first network device and the destination device.

19. The device of claim 1, where the one or more processors, when performing the action, are to one or more of:

perform a load balancing operation on the batch packet;

perform an intrusion detection operation on the batch packet;

perform a malware scan on the batch packet;

encrypt the batch packet;

encapsulate the batch packet; or transmit the batch packet.

20. The device of claim 1, where the batch packet includes:

a portion of variable size, the portion including the offset data, and the variable size being based on the number of individual network packets included in the set of individual network packets.

\* \* \* \* \*